Feb. 6, 1973 W. J. DRABLOWSKI 3,715,095
ADJUSTABLE CHRISTMAS TREE STAND
Filed June 16, 1971 3 Sheets-Sheet 1
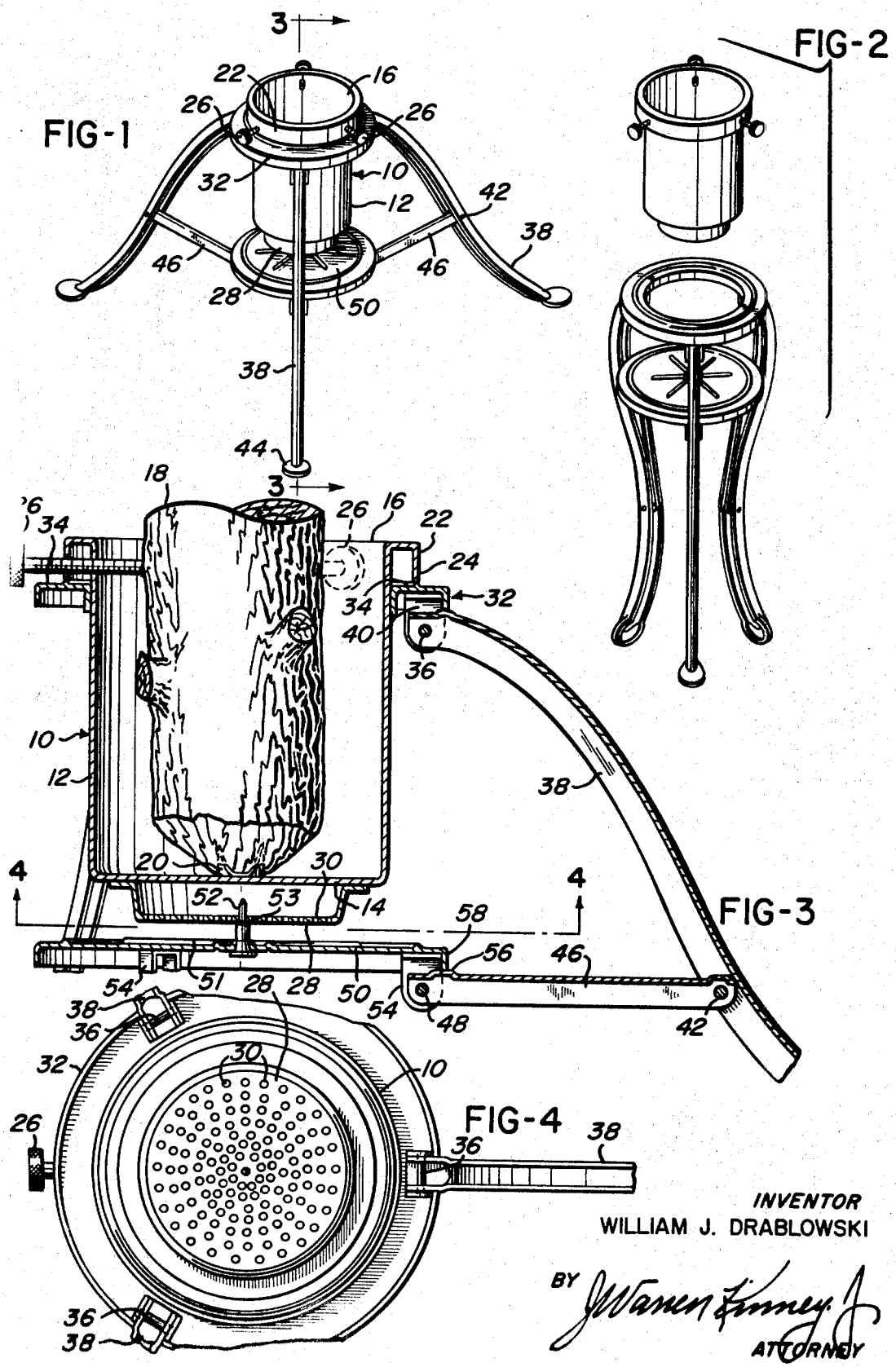
INVENTOR
WILLIAM J. DRABLOWSKI
BY J. Warren Kinney
ATTORNEY

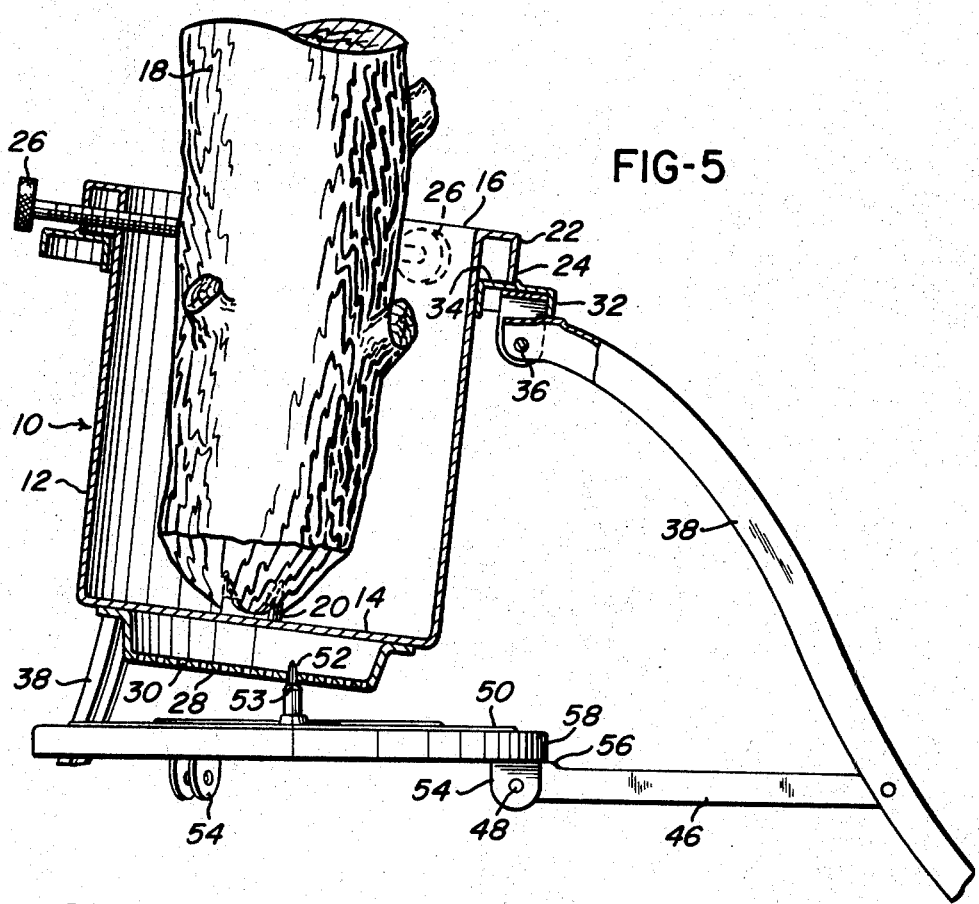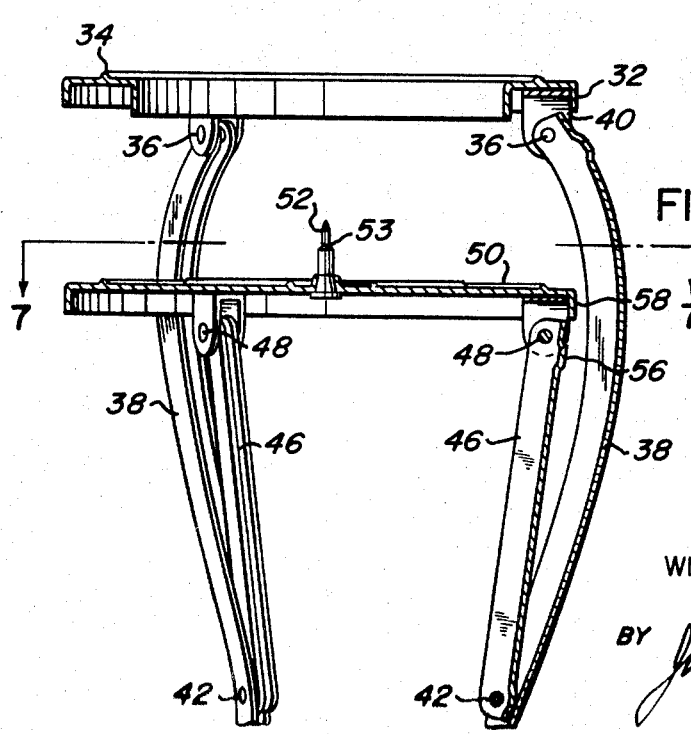

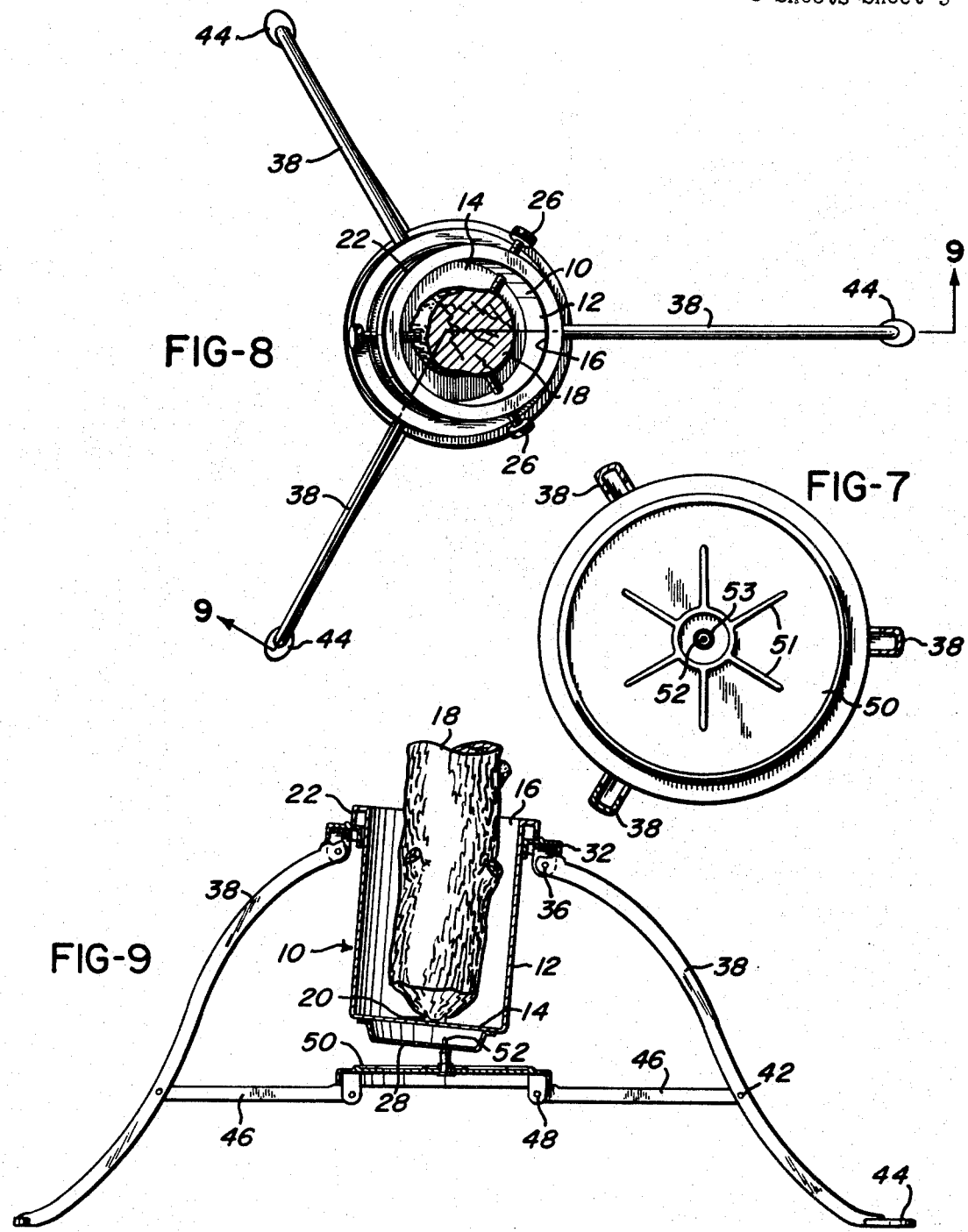

United States Patent Office 3,715,095
Patented Feb. 6, 1973

3,715,095
ADJUSTABLE CHRISTMAS TREE STAND
William J. Drablowski, Ludington, Mich., assignor to Wolverine Industries, Inc., Grand Rapids, Mich.
Filed June 16, 1971, Ser. No. 153,589
Int. Cl. A47g 33/12
U.S. Cl. 248—46    16 Claims

ABSTRACT OF THE DISCLOSURE

A receptacle for attachment to the end of a Christmas tree trunk is loosely and removably receivable in and peripherally supported from an upper supporting ring of a collapsible stand. A platform carried by the legs of the stand is movable relative to the supporting ring and carries an upstanding pin which is receivable within one of a plurality of perforations provided in the bottom portion of the receptacle for further supporting the receptacle and maintaining it in adjusted position relative to the stand.

BACKGROUND OF THE INVENTION

Field of the invention

This invention relates to an inexpensive, adjustable, foolproof, highly efficient Christmas tree stand of a type which is collapsible, and which when fully opened or extended, is adapted to receive and support, in adjusted positions, a receptacle including means for securing the end of a tree trunk inserted therein.

Description of the prior art

The prior art is best exemplified in the G. S. Pleiss Pat. 3,307,813 assigned to Handy Things Manufacturing Company, a wholly owned subsidiary of Wolverine Industries, Inc., assignee of this application; and the co-pending patent application of Robert W. De Vries, Ser. No. 23,685, filed Mar. 30, 1970, assigned to Wolverine Industries, Inc., assignee of the subject application. The aforesaid patent discloses a fixed Christmas tree stand of the type which includes a tree trunk receptive receptacle which is secured to and tiltably mounted relative to the upper portion of the stand for tiltable adjustment about each of two axes disposed at 180° for enabling the receptacle to be selectively pivoted about either or both of said axes, and thereafter be secured in adjusted position by means of a receptacle-bottom-retaining member carried by one end of a pivotally mounted foot actuated lever.

The device of the De Vries application comprises a tree trunk receptive receptacle which is secured to and tiltably mounted relative to the upper portion of the stand, the legs of which are collapsible between open and closed positions relative to the receptacle which is, at all times, secured to an upper portion of the stand. In the De Vries application a plurality of perforations are associated with the bottom portion thereof whereby to be engaged by an upwardly projecting locking pin carried by one end of a pivotally mounted foot actuated lever which, when lowered, will introduce said pin into a perforation for securely, though releaseably, locking the receptacle in adjusted position relative to the stand.

SUMMARY OF THE INVENTION

The device of the subject invention comprises a loose, detached, receptacle for the end of a Christmas tree trunk to which it is securely, though releaseably, anchored by means of a plurality of clamping screws carried by the receptacle. The receptacle is adapted to be bodily inserted and loosely received within the upper ring of a collapsible stand from which ring the peripheral rim of the receptacle is suspended. A platform is pivotally secured to the legs of the stand for vertical movement in a substantially horizontal plane between an elevated position adjacent the upper ring when the stand is fully collapsed, to a lowered position when the stand is fully opened. When in said lowered position the platform is disposed beneath and spaced from the bottom of the receptacle suspended from the upper ring. An upwardly projecting shouldered-pin is secured to and carried by the center of the platform, said pin being selectively receivable in one or the other of a plurality of perforations in the lower portion of the receptacle for providing a bottom support therefor, and for also securely, though releaseably, maintaining the receptacle in adjusted position about a vertical axis relative to the upper ring of the stand. The receptacle is in no way attached or secured to any portion of the stand except by the weight of the receptacle and its contents on the upper ring and platform of the stand.

BRIEF DESCRIPTION OF THE DRAWINGS

FIG. 1 is a perspective view of a Christmas tree stand of the present invention in operative condition.
FIG. 2 is a perspective view of the stand in collapsed condition.
FIG. 3 is an enlarged vertical cross-section taken on line 3—3 of FIG. 1.
FIG. 4 is a plan view on line 4—4 of FIG. 3.
FIG. 5 is a view similar to FIG. 3 showing the receptacle held in tilted position to plumb a bent tree trunk.
FIG. 6 is a fragmental enlarged cross-section of the folded or collapsed stand of FIG. 2.
FIG. 7 is a cross-section taken on line 7—7 of FIG. 6.
FIG. 8 is a top plan view of FIG. 5, showing the tree trunk in a cross-section.
FIG. 9 is a cross-section taken on line 9—9 of FIG. 8.

DESCRIPTION OF THE PREFERRED EMBODIMENT

An elongate cylindrical receptacle 10 of metal, plastic or other suitable material comprises a side wall 12, a bottom wall 14, and an open top 16 receptive of a tree trunk or shaft 18 the lower end of which may rest upon the receptacle bottom 14. The bottom wall carries a fixed upstanding spike or prong 20 to impale the shaft 18 at its lower end. The receptacle preferably is watertight and will ordinarily be kept supplied with water, when in use.

A circumferential rim or collar 22 surrounds the open top of the receptacle and has an annular lower edge or abutment 24. Rim 22 is radially drilled at three or more equally spaced locations, the drill holes being internally screw threaded to receive radially adjustable clamp screws 26, 26, 26. The screws are adapted to be advanced endwise against shaft 18 in customary manner to laterally support the shaft above the bottom wall of receptacle 10.

At a location beneath the receptacle bottom wall 14, and spaced therefrom, is fixed a foraminous member or plate 28, having numerous apertures 30 which are small and closely spaced apart, FIG. 4. The member 28 forms part of a retainer assembly whereby receptacle 10 may be positively locked in one of many positions of tilt or inclination, as suggested by FIG. 5.

The collapsible frame of the tree stand comprises an upper horizontal ring member 32 having an upper face or seat 34 upon which may rest the lower edge or abutment 24 of the receptacle rim, when the receptacle is placed within the large central opening of the ring member. The receptacle is not attached to ring member 32, but may be freely suspended therefrom for instant removal and replacement, the clearance between the ring member opening and the receptacle side wall being sufficient to permit rotation of the receptacle therein.

At several locations about ring member 32 are located pivots 36 upon which are suspended the legs 38 of the stand, each of which has its upper end pivoted upon the ring member for movement toward and from the central axis thereof. Pivot 36 may be carried by three depending lugs 40 fixed to the ring member.

Each leg 38 includes an intermediate pivot 42 and a foot 44. At each pivot 42 is pivoted a leg brace 46 having an inner end pivot 48. A circular platform 50 carrying a fixed upstanding retaining element 52, carries at its outer periphery three depending fixed lugs 54 each of which supports the pivot 48 of a leg brace. The platform 50, the legs 38, and the leg braces 46, constitute a folding leg structure that may be extended from the collapsed inoperative position of FIG. 2 to the operative extended position of FIG. 1.

The extent to which the platform 50 may be lowered, is limited by stops on the braces and the platform, said stops being in the present exemplification shown as an upper seat 56 on the brace located outwardly of the pivot 48, and a down-turned flange or abutment 58 on the platform adapted to stop against seat 56. Each leg brace carries a seat such as 56, and platform 50 carries an equal number of abutment areas 58 each engageable with a seat 56.

In the light of the foregoing explanation, it should be understood that outward spreading of legs 38 from the FIG. 2 folded position results in lowering the platform 50, as in FIG. 3, to the extent permitted by stops 58, 56. In its lowermost position the level of platform 50 may approximate the level of pivots 48 and 42, so that the platform and all the leg braces may rest in a common substantially horizontal plane. The platform is suitably reinforced by means of ribs 51.

In the fully lowered position of platform 50 it is located below and spaced from the bottom plate 28 of the receptacle 10, however, the retaining pin 52 carried thereby will project upwardly through one of the apertures 30 of member 28. By this means, the inclination or tilt angle of the axis of receptacle 10 may be established and maintained.

If the trunk or shaft 18 has a bend, as suggested in FIG. 5, the receptacle 10 may be held by pin 52 in a tilted condition as shown, to compensate for the irregularity and make the upper portion of the trunk appear plumb. The retaining pin 52 may be placed in alignment with whatever perforation will provide the desired angle of tilt necessary to plumb the tree trunk.

It is noteworthy that the proper elevation of retaining pin 52 is automatically and definitely established by the simple act of unfolding the stand to operative condition, this being an important function of the platform-supported abutments 56, 58. Important also is the fact that receptacle 10 is readily removable by bodily lifting it from the supportive ring member 32 for adjustment, cleaning or replacement. If receptacle 10 is damaged in use, it may easily be replaced and no disassembly of the stand itself is involved.

In practice, the foraminous member 28 could serve as the bottom wall of receptacle 10, provided that the receptacle is not required to be watertight. That is, the receptacle bottom wall 14 could be perforated to accept the retaining pin 52, thereby making possible the elimination of part 28, if desired. Also, if receptacle 10 is not to be watertight, its side wall 12 need not be a solid wall as shown, but may instead be fabricated merely as an elongate cage whose side wall might be largely open to expose the trunk or shaft 18.

The stand constructed as herein disclosed will safely and securely support the shaft or trunk of a tree without risk of release and possible overturning of the structure, particularly since a portion of the weight of the tree supported thereby is utilized to prevent disengagement of the retaining pin 52 from its counterpart member 28. Pin 52 has a shoulder 53 adapted to abut against and engage the lower surface of the foraminous member 28 immediately adjacent the particular perforation into which the pin is inserted, whereby to support part of the weight of the tree and receptacle 10.

An inherent springiness or resiliency in the platform and braces 46 serves constantly to urge pin 52 into an operative receptacle-retaining position.

OPERATION

In practice, the stand is packaged in the collapsed condition of FIG. 2, usually in a rectangular elongate carton. Upon removal from the carton, the stand minus receptacle 10 may be easily expanded to the FIG. 1 condition by simply grasping the legs and pulling them outwardly, this resulting in lowering of platform 50 to approximately the position of FIG. 3.

With the tree resting preferably on its side, the cup or receptacle 10 may be slid onto the end of the tree trunk, with force applied to engage the spike or prong 20 at the receptacle bottom. Then the receptacle may be secured in place by tightening the screws 26 against the trunk.

With the receptacle attached, the tree may be righted and lifted above the stand, and then lowered to dispose the receptacle within ring member 32. In lowering the tree, it should be in a substantially vertical condition, so far as is possible, whereupon at the home position of the receptacle it will be laterally restrained by pin 52 entering one of the holes 30. Final adjustment of the tree angle ordinarily may be achieved by rotating the receptacle upon the shoulder 53 of pin 52 and within ring 32, to a position of maximum display advantage of the tree. Should further adjustment be required, the tree angularity may be altered by bodily lifting the tree and the attached receptacle slightly, for disengaging the pin 52 and re-engaging it with a different hole 30. The tree and receptacle 10 are always subject to rotation relative to the stand, in order to obtain a most advantageous disposition of the best side of the tree for purpose of display.

It may here be noted that the circumferential rim or collar 22 of receptacle 10 will rest evenly and uniformly upon the bearing face or seat 34 of the supporting ring 32, irrespective of the tilt angle of the receptacle. In this connection, compare FIGS. 3, 5 and 9, which illustrate different angles of tilt of the receptacle resorted to for effectively displaying trees having a crooked trunk. The desired uniformity of bearing between rim 22 and ring 32, results from an inherent flexibility of the stand due to loose pivot reactions at 36 and 42 which are present whenever pin 52 is free of engagement with holes in the receptacle bottom member 28. The aforesaid flexibility of the stand is nullified by entry of pin 52 into any one of the holes 30.

From the foregoing explanation, it should be understood that the retaining pin while engaged acts to rigidify the stand in various tilted positions of the ring 32 and receptacle 10, while said ring effectively supports the receptacle. As was previously noted herein, a portion of the weight of the tree and receptacle 10 are imposed upon platform 50 through the agency of pin shoulder 53, for enhancing stability of the structure in use.

The relationship between the connections between the legs and ring member; legs and leg braces; and leg braces and platform are such as to impart an angular movement to the ring member, whereby said member is adapted to, and will conform to the inclination of the external rim of the receptacle; that is, the upper seating surface of the ring member will assume the same inclination as the lower end of the external rim of the receptacle. The foregoing parallel relationship between the receptacle rim and upper seating surface of the ring member will be maintained even though the receptacle and its contents are bodily rotated through 360° about pin 52 in an aperture 30 of the foraminous member 28. The platform 50 will be maintained in a substantially horizontal position (see FIG. 5) even though, and while the ring member is tilted.

What is claimed is:

1. A collapsible stand for supporting an elongate shaft in a vertical or selectively inclined position, said stand comprising in combination: an elongate open-topped shaft-supporting receptacle tubular in form and including a foraminous member, and an external rim surrounding the open top of the receptacle; adjustable means associated with the receptacle for laterally supporting a shaft inserted into the receptacle; a ring member having an opening therein to receive the receptacle with sliding clearance, said ring member including an upper seating surface engageable by the receptacle rim for suspending the receptacle by its rim within the opening of the ring member; a plurality of movable legs each having a foot end, an upper end, and an intermediate portion; means pivoting the upper ends of the legs upon said ring member in depending spaced relation; a plate-like platform; an upstanding retaining pin fixed upon the platform; a plurality of elongate leg braces each of which has an end pivotally connected with a leg at said intermediate portion thereof; means pivotally connecting the other end of each brace to the platform; and means operative when the legs are extended outwardly from the ring member, to maintain the platform and the retaining pin in a supported position at which said pin penetrates an aperture of the foraminous member.

2. The combination as defined in claim 1, wherein the last mentioned means includes means which imparts angular movement to said ring member whereby to conform to the inclination of the rim of a receptacle engaging the upper seating surface of said ring member.

3. The combination as defined in claim 1, wherein the last mentioned means includes means which maintains the platform in a substantially horizontal plane.

4. The combination as defined by claim 1, wherein the means last mentioned comprises abutments on the platform, and cooperative abutments one upon each leg brace, engageable incident to the outward extending of said legs.

5. The combination as defined by claim 1, wherein the receptacle is fluid-tight for the storage of water.

6. The combination as defined by claim 1, wherein the receptacle is free of attachment with and freely removable from the ring member.

7. The combination as defined by claim 1, wherein the receptacle is fluid-tight for the storage of water, and is free of attachment to the ring member.

8. The combination as defined by claim 1, wherein said rim includes abutment means outside the limits of the receptacle interior, the seating surface being engaged by the abutment means in suspending the receptacle by its rim.

9. The combination as defined by claim 8, wherein the adjustable means aforesaid comprises a plurality of independent adjusting screws extending radially inwardly through internally threaded openings provided in said rim.

10. The combination as defined by claim 1, wherein said open-topped receptacle includes an imperforate bottom wall overlying said foraminous member.

11. The combination as defined by claim 4, wherein said rim includes abutment means outside the limits of the receptacle interior, the seating surface being engaged by the abutment means in suspending the receptacle by its rim.

12. The combination as defined by claim 1, wherein the pin includes an abutment engageable with the foraminous member adjacent the particular aperture which is penetrated by the pin.

13. The combination as defined by claim 12, wherein there is an abutment on said pin transferring a part of the weight of the receptacle and its contents to the platform.

14. The combination as defined by claim 13, wherein the receptacle is free of attachment with, freely rotatable within, and unrestrictedly removable from, said ring member.

15. The combination as defined by claim 1, wherein the receptacle is free of attachment with, freely rotatable within, and unrestrictedly removable from, said ring member.

16. The collapsible stand as defined in claim 1, wherein there is an abutment on said pin transferring a part of the weight of the receptacle and its contents to the platform.

References Cited

UNITED STATES PATENTS

| 1,766,170 | 6/1930 | Goldwood | 248—46 |
| 2,755,049 | 7/1956 | Curtiss | 248—46 |
| 3,307,813 | 3/1967 | Pleiss | 248—44 |

FOREIGN PATENTS

| 382,254 | 10/1923 | Germany | 248—46 |

WILLIAM H. SCHULTZ, Primary Examiner